(12) United States Patent
Leyton et al.

(10) Patent No.: US 12,423,863 B2
(45) Date of Patent: Sep. 23, 2025

(54) COMPUTER IMPLEMENTED METHOD AND SYSTEM FOR PROVIDING AN AUGMENTED REALITY ENTERTAINMENT ENVIRONMENT

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 280 days.

(21) Appl. No.: 18/208,086

(22) Filed: Jun. 9, 2023

(65) Prior Publication Data
US 2023/0401739 A1 Dec. 14, 2023

(30) Foreign Application Priority Data

Jun. 10, 2022 (GB) ...................................... 2208505

(51) Int. Cl.
| | | |
|---|---|---|
| *G06T 7/73* | (2017.01) | |
| *A63F 13/52* | (2014.01) | |
| *A63F 13/5372* | (2014.01) | |
| *G06T 11/00* | (2006.01) | |
| *G06V 20/20* | (2022.01) | |

(52) U.S. Cl.
CPC ............... *G06T 7/73* (2017.01); *A63F 13/52* (2014.09); *A63F 13/5372* (2014.09); *G06T 11/00* (2013.01); *G06V 20/20* (2022.01)

(58) Field of Classification Search
CPC . G06T 7/73; G06T 11/00; A63F 13/52; A63F 13/5372; G06V 20/20
See application file for complete search history.

(56) References Cited

U.S. PATENT DOCUMENTS

| | | |
|---|---|---|
| 2015/0097862 A1 | 4/2015 | Reisner-Kollmann et al. |
| 2015/0187108 A1 | 7/2015 | Mullins |
| 2017/0278304 A1 | 9/2017 | Hildreth et al. |
| 2018/0008141 A1* | 1/2018 | Krueger ............... A61B 5/7257 |
| 2018/0173323 A1* | 6/2018 | Harvey ................... G06F 3/011 |
| 2018/0300897 A1* | 10/2018 | Woods .................. G06F 3/0481 |

(Continued)

FOREIGN PATENT DOCUMENTS

| | | |
|---|---|---|
| CN | 114120067 A | 3/2022 |
| CN | 114254663 A | 3/2022 |

(Continued)

OTHER PUBLICATIONS

UK IPO Combined Search and Examination Report received in Application No. GB2208505.4, date of search Dec. 16, 2022, in 7 pages.

(Continued)

*Primary Examiner* — Reginald A Renwick
(74) *Attorney, Agent, or Firm* — Kilpatrick Townsend & Stockton LLP (57) ABSTRACT

A method and system are provided which enable an object, known or unknown, to be augmented with additional visual elements. This may provide a more immersive experience, for example, when gaming or viewing content.

19 Claims, 8 Drawing Sheets

(56) References Cited

U.S. PATENT DOCUMENTS

| | | |
|---|---|---|
| 2019/0347846 A1 | 11/2019 | Olson et al. |
| 2020/0184653 A1 | 6/2020 | Faulkner |
| 2020/0334908 A1 | 10/2020 | Wilson et al. |
| 2020/0368616 A1 | 11/2020 | Delamont |

FOREIGN PATENT DOCUMENTS

| | | |
|---|---|---|
| CN | 114548279 A | 5/2022 |
| WO | 2015/175730 A1 | 11/2015 |
| WO | 2019/043568 A1 | 3/2019 |
| WO | 2022/005850 A1 | 1/2022 |

OTHER PUBLICATIONS

Extended European Search Report received in corresponding EP Application No. 23174666.0, dated Oct. 30, 2023, in 9 pages.

\* cited by examiner

COMPUTER IMPLEMENTED METHOD AND SYSTEM FOR PROVIDING AN AUGMENTED REALITY ENTERTAINMENT ENVIRONMENT

TECHNICAL FIELD

The invention relates to a computer-implemented method and system. Particularly, but not exclusively, the invention relates to a computer-implemented method and system for providing an augmented reality entertainment environment.

BACKGROUND

Current gaming systems are limited to the capabilities of their physical hardware. In real-world situations, a user is limited to the physical properties of the input device (e.g. games controller) which they are using to interact with the gaming environment they are utilising.

These limitations on physical hardware can limit the user experience and, perhaps more seriously, substantially increase the difficulty of interacting with the content which the user is consuming or interacting with.

Also, users of entertainment systems are desiring more and more personalisation in their entertainment environments. This is especially true as content is directed at broader, more diverse segments of society.

Aspects and embodiments were conceived with the foregoing in mind.

SUMMARY

Aspects and embodiments relate to providing an augmented reality entertainment environment. An augmented reality entertainment environment may mean an environment which is generated by augmented reality equipment for the purposes of consuming or interacting with content. Examples of content may be a video game, a television show, a film or another form of multimedia entertainment.

Viewed from a first aspect, there is provided a computer-implemented method for providing an augmented reality entertainment environment. The augmented reality entertainment environment may be provided by any suitable augmented reality equipment. The method may be implemented by a processing resource. The processing resource may be hardware or software implemented. The processing resource may comprise one or more processors. The processing resource may be part of augmented reality equipment or in communication with augmented reality equipment. The method may comprise the steps of initialising the augmented reality entertainment environment at a location. This may be responsive to user input or automatic when a user initialises use of augmented reality equipment e.g. dons an augmented reality headset. The method may comprise determining the presence of a physical object at the location. This may further comprise determining the location of a physical object at the location. In respect of a physical object, the location refers to the specific position in physical space. This may be by use of simultaneous location and mapping (SLAM) technology or any other suitable approach for determining the presence of a physical object where an augmented reality environment has been initialised. The method may further comprise determining whether the physical object is a known or unknown physical object and, if the physical object is determined to be known, retrieving position tracking data for the object. The determination may be made based on storage accessible to the processing resource in that a request may be provided to storage to determine whether the object has been identified previously or not. The method may further comprise generating at least one visual element for rendering in the augmented reality entertainment environment; rendering the visual element in the augmented reality environment relative to the location of the physical object, i.e. the visual element is rendered in a virtual location in the augmented reality environment relative to the physical location of the physical object. If the physical object is determined to be unknown, identifying the object, generating position tracking data for the object to track the position of the object (which may comprise the determination of bounding box data); generating at least one visual element for rendering in the augmented reality entertainment environment; and rendering the visual element in the augmented reality environment relative to the location of the physical object. This may be by using the identified position of the physical object and using that information to locate the generated visual element in the augmented reality environment in a position where it appears to overlay or sit adjacent to the physical object.

A method in accordance with the first aspect may provide an enhanced augmented reality entertainment environment in that known or unknown physical objects can be identified and used as a reference position for a visual element which can then be rendered in the augmented reality environment. The method in accordance with the first aspect may be initialised responsive to user input. The user input may select a physical object for identification. The method in accordance with the first aspect may be carried out in real time, i.e. responsive to a user providing input to a user interface and then the next step is performed as the information and/or data necessary for the previous step has been determined.

The visual element may be rendered in the augmented reality entertainment environment in such a way that it is synchronised with content being consumed inside the augmented reality entertainment environment. The visual element may be synchronised with other forms of feedback such as haptic feedback or additional audio feedback which is fed into the augmented reality entertainment environment.

The generation of the visual element for rendering in the augmented reality entertainment environment may comprise generation of a graphical overlay. The graphical overlay may be of any suitable geometry. The graphical overlay may be generated in a suitable form for rendering inside an augmented reality entertainment environment. The graphical overlay may be dimensioned or configured based on a user profile corresponding to a user using the augmented reality entertainment environment.

For example, the graphical overlay is dimensioned to at least partially cover the physical object. At least partially cover means that it appears to overlay at least a part of the physical object in the augmented reality entertainment environment.

The graphical overlay may be at least partially animated in that it may comprise a sequence of visual images which are combined together and rendered in the augmented reality entertainment environment in a way in that they appear to flow continuously from one another.

The generation of the graphical overlay may be based on content being displayed in the augmented reality entertainment environment. This means that the augmented reality environment can be augmented to include visual elements which enhance the content which is being consumed or interacted with by the user. The content may be a video game or a television program or film being displayed inside the augmented reality entertainment environment.

The generation of a graphical overlay may be based on content being displayed on the physical object. For example, the physical object may be a monitor being used to view a film. The graphical overlay may comprise subtitles for the film. This enhances the user experience as the user may need to understand the film in a different language from what is generally used to display the film.

The generation of the graphical overlay may be based on an in-game element for a game being played by at least one user of the augmented reality entertainment environment. This may provide a more immersive gaming experience. The in-game element may determine that the visual element changes colour or reduces in some way. The in-game element may determine that the visual element may be temporarily altered responsive to an in-game element. An example may be a goal scored inside a football game which causes the visual element to flash with different colours.

The at least one visual element may comprise a stream of information. This means that information can be rendered inside the augmented reality entertainment environment. The stream of information may be provided by a component accessible by the processing resource which can access information external to the augmented reality entertainment environment, e.g. a social media feed or a feed from a website. The effect of this is that information from external sources can be streamed into the augmented reality entertainment environment.

The stream of information may be based on content being displayed in the augmented reality entertainment environment and may comprise subtitles related to the content being displayed in the augmented reality entertainment environment. This means that subtitles can be provided through the augmented reality entertainment environment. This means that a person who is viewing content as part of a group, for example, can view subtitles in a preferred language, for instance, or can view subtitles without causing irritation to others.

The physical object may be identified using a trained model. Such a trained model may be trained on images of the physical object. The trained model may deploy an artificial neural network (ANN) or a convolutional neural network (CNN), for example.

ANNs can be hardware—(neurons are represented by physical components) or software-based (computer models) and can use a variety of topologies and learning algorithms.

ANNs usually have three layers that are interconnected. The first layer consists of input neurons. Those neurons send data on to the second layer, referred to a hidden layer which implements a function and which in turn sends the output neurons to the third layer. There may be a plurality of hidden layers in the ANN. With respect to the number of neurons in the input layer, this parameter is based on training data.

The second or hidden layer in a neural network implements one or more functions. For example, the function or functions may each compute a linear transformation or a classification of the previous layer or compute logical functions. For instance, considering that the input vector can be represented as x, the hidden layer functions as h and the output as y, then the ANN may be understood as implementing a function f using the second or hidden layer that maps from x to h and another function g that maps from h to y. So the hidden layer's activation is $f(x)$ and the output of the network is $g(f(x))$ CNNs can be hardware or software based and can also use a variety of topologies and learning algorithms.

A CNN usually comprises at least one convolutional layer where a feature map is generated by the application of a kernel matrix to an input image. This is followed by at least one pooling layer and a fully connected layer, which deploys a multilayer perceptron which comprises at least an input layer, at least one hidden layer and an output layer. The at least one hidden layer applies weights to the output of the pooling layer to determine an output prediction.

Either of the ANN or CNN may be trained using images of physical objects which may be identified or need to be identified in accordance with the method. The training may be implemented using feedforward and backpropagation techniques.

Locating the visual element in the augmented reality entertainment environment may comprise synchronising the position of the visual element with the identified position of the physical object. That is to say, the visual element may be positioned to appear as if it is in the same position as the physical object. Alternatively, the location of the visual element may be adjusted when it is determined that the position of the physical object has been adjusted.

Locating the visual element in the augmented reality entertainment environment may comprise locating the visual element adjacent to the physical object. This may mean that the visual element is located around the periphery of the physical object.

The visual element may comprise control indicia for content being displayed in the augmented reality entertainment environment. The visual element may be located adjacent to a button on the physical object. The control indicia may indicate how the button corresponds to content being displayed inside the augmented reality entertainment environment. For example, a game being played by a user of the augmented reality entertainment environment may require use of a specific button for an in-game command. The control indicia identifies that command and it is positioned next to or near to the corresponding button. That is to say, the location of the button is identified (perhaps by landmarking techniques) and the description of the command is rendered in the augmented reality entertainment environment next to the button to enable the user to easily see which button is required to provide a specific command.

Viewed from a second aspect, there is a system configured to implement the method of the first aspect.

DESCRIPTION

The following detailed description is merely illustrative in nature and is not intended to limit the discussed examples or embodiments of the subject matter or the application and uses of such embodiments. As used herein, the word "example" means "serving as an example, instance or illustration". Any implementation described herein as an example is not necessarily to be construed as advantageous over other implementations.

Aspects and embodiments of the present disclosure will now be described, by way of example only, and with reference to the accompany drawings, in which.

Figure 1:
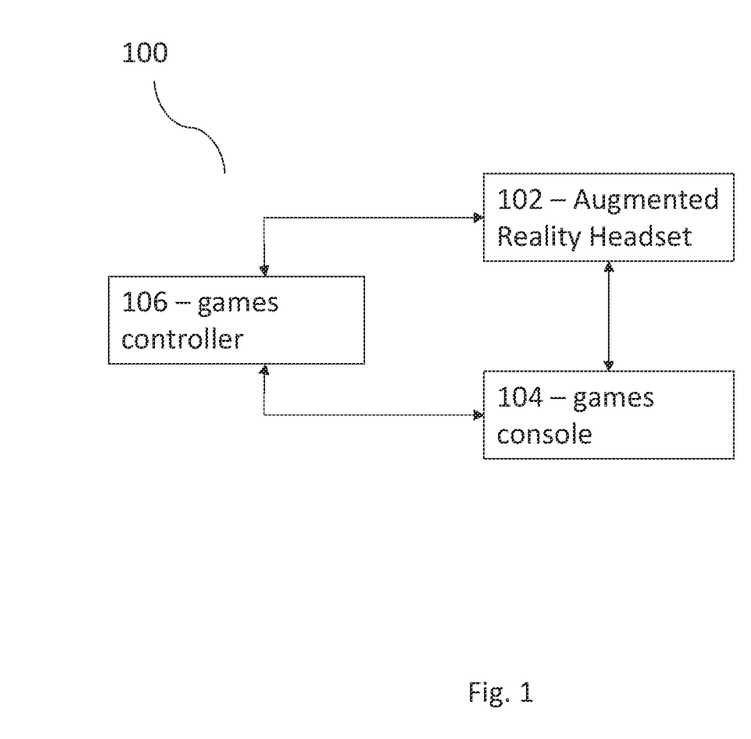
FIG. 1 illustrates an augmented reality entertainment system in accordance with a first embodiment.

We now describe, with reference to FIG. 1, an augmented reality entertainment system 100 in accordance with an embodiment.

The system 100 comprises an augmented reality headset 102 which can be worn on the head of a user. The augmented reality headset 102 is configured to generate an augmented reality environment around the user. Example augmented reality headsets may be the Oculus Rift or the Sony™ SmartEyeGlass.

Although an augmented reality headset 102 is used to describe the embodiment, other examples of augmented reality equipment which can provide an augmented reality environment can also be used.

The augmented reality headset 102 is further configured to communicate with a games console 104 and a games controller 106 which can be used to provide input to the games console 104 during gameplay or some other entertainment environment which is provided by the augmented reality headset 102. The communication between the headset 102, the games console 104 and the games controller 106 may be implemented using any suitable telecommunications network or protocol.

For example, as will be described below, the augmented reality entertainment environment which is provided by the augmented reality headset need not only be used for gaming but could also be used to view content such as a television program or a sports event. The communication between the augmented reality headset 102 and the games console 104 and the games controller 106 may be implemented using any suitable telecommunications protocol.

The games console 104 may be, for example, a Sony Playstation 5. The games controller 104 may be a Sony Playstation controller. However, the games controller 104 is an example of a user input device. Other example user input devices may be, for example, a keyboard, a mouse, a mobile telephone screen or another type of games controller.

Figure 2:
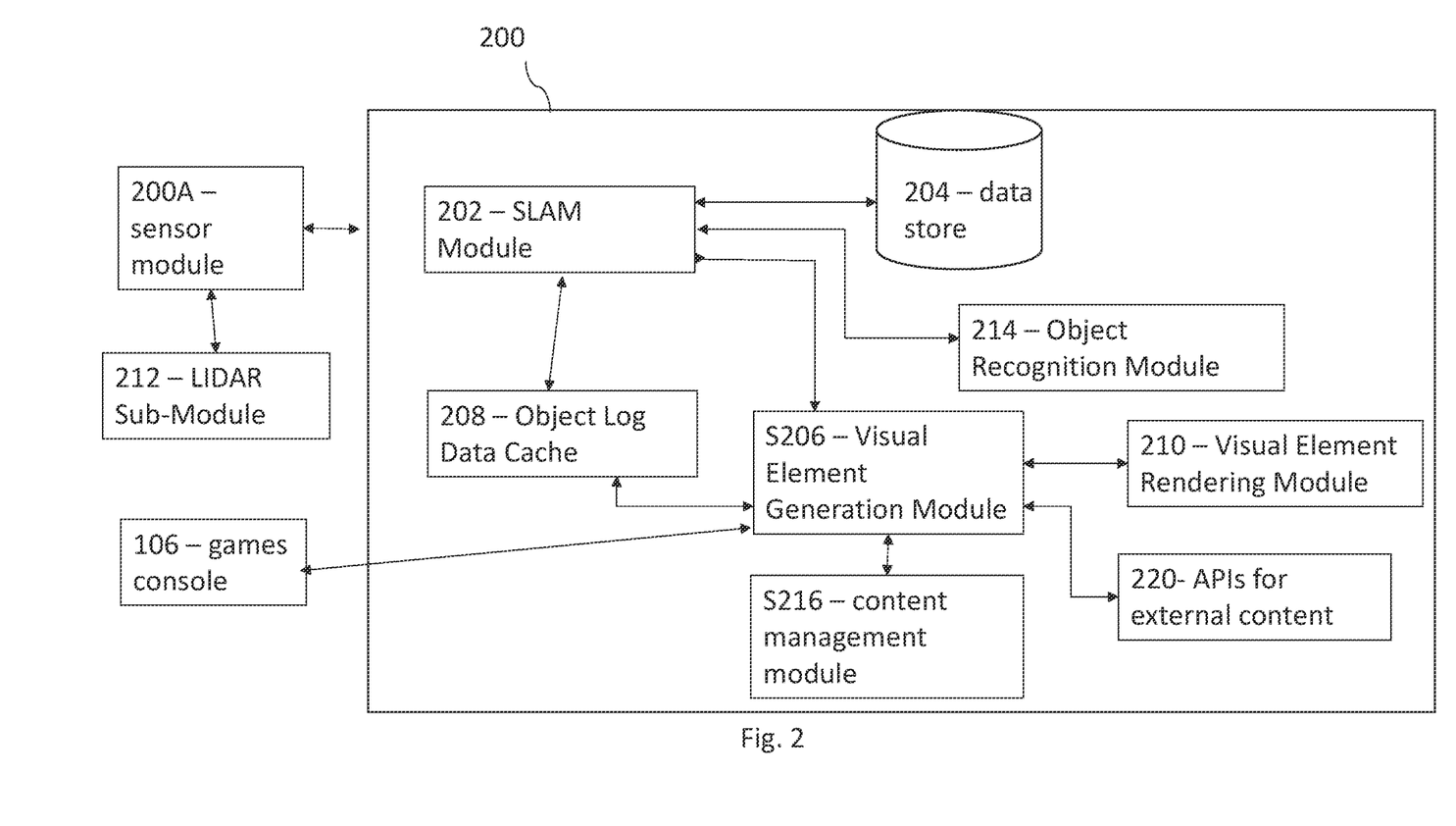
FIG. 2 illustrates an environment mapping module in accordance with the first embodiment.
Figure 3:
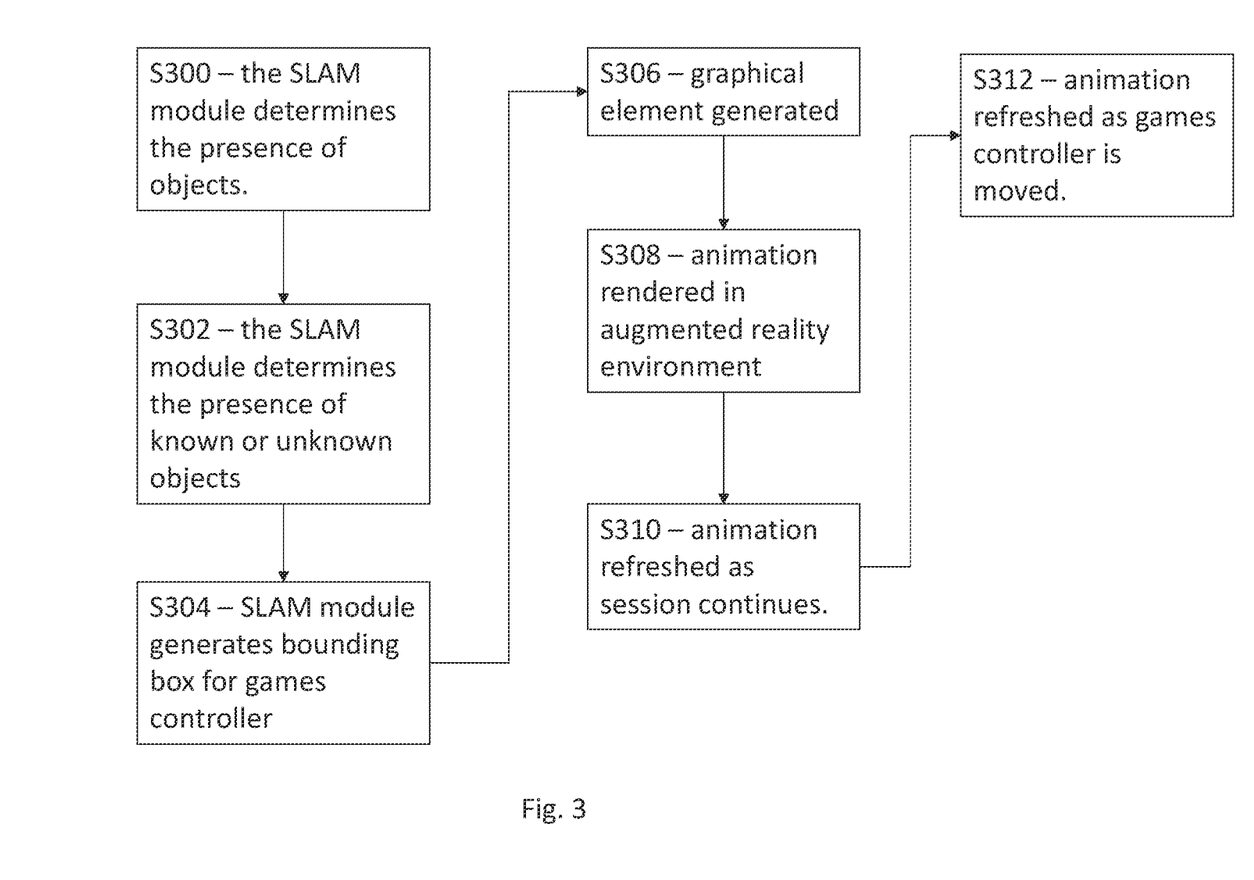
FIG. 3 illustrates a flow diagram for the overlay of an animation over a known games controller in accordance with the first embodiment.

We will now describe, with reference to FIG. 2 and FIG. 3, how visual elements may be positioned in the augmented reality entertainment environment provided by the augmented reality headset 102.

The augmented reality headset 102 comprises an environment mapping module 200 which is coupled to a sensor module 200A mounted to the augmented reality headset 102. The sensor module 200A may comprise a camera, accelerometer and gyroscope, a global positioning sensor, a light sensor and a depth sensor which are each configured to capture data from the environment around them. The environment mapping module 200 may comprise a SLAM (Simultaneous Localization and Mapping) module 202. SLAM technology is described at https://www.navvis.com/technology/slam and www.andreasjakl.com/basics-of-ar-slam-simultaneous-localization-and-mapping. The SLAM module 202 provides the augmented reality headset 102 with the functionality to map the three-dimensional world around the user who has donned the augmented reality headset 102. The SLAM module 202 provides a SLAM estimate of the surrounding environment and comprises an internal front end which performs feature extraction of the captured sensor data (from sensor module 200A). This may include landmark identification using landmarking techniques which may be used to identify key map points on objects inside the surrounding environment. The SLAM module 202 further comprises an internal back end which uses the data output from the internal front end to determine the relationships between different frames, localization of the camera, geometrically reconstructing the surrounding environment as captured by the sensor module 200A. An internal output module provides output data indicative of the surrounding environment, including data for the physical objects in the surrounding environment, the locations of those objects and landmark data corresponding to landmarks on those objects.

The environment mapping module 200 is implemented using any suitable processing resource, which may be hardware or software implemented. The environment mapping module 200 may be located in the cloud and in communication with the augmented reality headset 102 wherein any suitable telecommunications network can be used to transmit data from the headset to the module for processing before it is returned to the headset 102.

In a step S300, when the augmented reality environment is generated by the augmented reality headset 102, the augmented reality headset 102 uses the SLAM module 102 to determine the presence of physical objects within the location at which the augmented reality environment is being generated. This data is output to the internal output module and includes the data which represents the geometry of the physical objects, the location of those objects and corresponding landmark data corresponding to landmarks on those objects. The SLAM module 202 is configured to generate bounding data for objects which have not previously been identified by the SLAM module 102. That is to say, the SLAM module 202 is configured to determine whether an object has been previously identified by the system or to the system (i.e. the object is known) or whether the object has not been previously identified to the system (i.e. the object is unknown). The bounding data can then be stored in data store 204. In a step S302, the SLAM module 102 receives a stream of data from the location, via the sensor module 200A, and uses that data to determine the presence of objects which may be known or unknown to the SLAM module 102.

The SLAM module 202 accesses a data store 204 to retrieve previously loaded data regarding the objects which have previously been recognised by the SLAM module 102. If any of the objects which have been determined are already stored in the data store 204, then bounding data for that object can be retrieved and used (as will be described below) to provide a bounding box on that object which is then used by the SLAM module 202 to track the position of that object and provide further effects linked to the game being played on the games console 104.

In this example, the SLAM module 202 determines the presence of known games controller 106 and uses that data to identify the object as a games controller which is then logged in an object log data cache 208 for that augmented reality entertainment session. In a step S304, the SLAM module 202 generates a bounding box for the games controller using bounding data previously generated by the SLAM module 202, i.e. as the games controller is known due to its previous identification to the system. Known objects may be loaded into the system prior to use of the system to enable the system to recognise those objects from the start of their use. The SLAM module 202 then uses the bounding box as a reference to track the position of the games controller 106 in combination with the data from the sensor module 200A. This can be used to estimate the position of the games controller 106 relative to the augmented reality headset 102 and also track other actions involving the games controller 106 such as movement of the games controller 106 and the rotation of the games controller 106, which may happen frequently when playing games using the games controller 106.

In a step S306, the visual element generation module 206 is configured to respond to the entry of the identified games controller 104 in the object log data cache 208 and generate a graphical element which can then be rendered in the augmented reality environment generated by the headset 102. The visual element generation module 206 accesses the bounding data for the games controller 106 (as generated by the SLAM module 202) and uses that to generate an animation which can then be rendered in the augmented reality environment by the visual element rendering module 210. Any standard rendering techniques or algorithms may be utilised.

The visual element rendering module 210 accesses the position data for the games controller 104 to determine where the games controller is relative to the augmented reality headset 102. The position data may be determined from the bounding box which is used to track the position of the games controller. The position data for the games controller can be obtained from the SLAM module 202 which determines and tracks the position of the games controller in real time using sensor module 200A. The position data details where the games controller 104 is in 3-dimensional space. The visual element rendering module 210, having accessed the bounding box data for the games controller, can then render the animation in the augmented reality environment in a location (i.e. a virtual location in the augmented reality environment) where it overlays the games controller 104. This is step S308. In other words, the animation appears in the augmented reality environment as if it is covering the games controller 104.

That is to say, the position data for the games controller 104 is used to determine the location of a visual element which is rendered in the augmented reality entertainment environment in that the visual element is rendered in such a way that it appears to cover the games controller 106. In this example, the visual element is an animation and can therefore appear as an animation which covers the games controller 104 as the user is using the games controller 106 as an input device to provide commands to the games console 106.

Another term which may be used to describe the animation may be a "virtual skin" around the games controller 104. The animation may also be determined based on a user profile for the user. That is to say, the user may indicate a preferential colour or style for the animation and that may be fed to the visual element generation module 206 which then uses the preferential colour or style to generate the animation.

The rendering of the animation continues whilst the games controller 104 is being used. This is step S310.

The rendering of the animation also refreshes as the games controller 104 is moved in physical space. The movement may comprise changes in orientation, for instance, or simple translation in the horizontal or vertical axes. The SLAM module 202 tracks the position of the games controller 104 using the data captured by sensor module 200A and re-generates the animation as the position of the games controller 104 changes using the bounding box. This is step S312. The tracking of the games controller 104 and the rendering of the visual element continues as the user uses the games controller 104.

The visual element generation module 206 may receive input from the games console 106 which indicates data relating to the game being played on the games console 106. This data may comprise animation data which can be used by the visual element generation module 206 to generate the animation. The animation data may indicate to the visual element generation module 206 that the animation comprises various items of content. For example, for a specific games title, the animation may be generated in such a way that it uses specific colours or images which are also used in the game. The animation may be synchronised with haptic feedback provided by the games controller 104.

The animation data may relate to a recent in-game event and this may cause the animation to respond in real-time to the game. For example, the games console 106 may feed data relating to an in-game event to the visual element generation module 206 which indicates an event in the game which is then used to modify the animation. A specific example may be the diminishing condition of a player's character in a game. A loss of health of a character may for instance be represented in the animation as a change in colour or a loss of part of the animation. Another example may be the representation of an in-game character controlled by the user. In a motor racing game where the vehicles are different colours, for example, the animation provided for a user may correspond to the colour of the user's vehicle.

That is to say, in the first embodiment, the games controller 104 is identified as a known object and a virtual skin is provided around the games controller 104 during game play. The virtual skin is provided in the augmented reality entertainment environment which is generated by the augmented reality headset 102.

Figure 4:
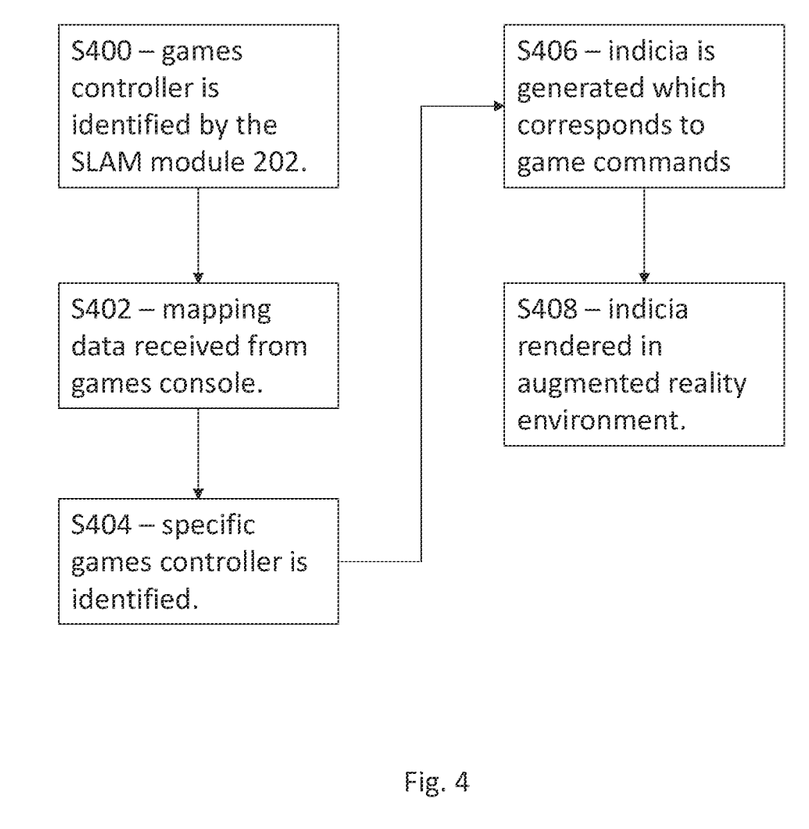
FIG. 4 illustrates a flow diagram for the overlay of control indicia over a known games controller in accordance with a second embodiment.

We now illustrate, with reference to FIG. 4, a second embodiment where system 100 is used again to provide an augmented reality entertainment environment where a games controller 104 is again identified in the environment in the same way described above. In this example, control indicia are overlaid into the augmented reality entertainment environment as will be described below.

In a step S400, the games controller 104 is identified as a known object by the SLAM module 202 as set out above. The games console 106 is configured to interpret inputs from the games controller 104 and these are converted into specific commands which are translated into the gaming environment which is generated by the games console 106. That is to say, whilst the games console 106 is a fixed piece of apparatus with a specific form factor and specific buttons positioned about its geometry, the buttons are used to provide game-specific commands into the gaming environment generated by the games console 106. In other words, each gaming title which may be played on the games console 106 has commands which correspond to a button on the games controller 104 or a combination of buttons on the games controller 104. The SLAM module 202 identifies the buttons as landmarks on the games controller 104 using standard landmark identification techniques. That is to say, the "X" button may be identified as a landmark on the games controller 104 and the 3-dimensional position data for the "X" button (and other buttons) may then be saved in the data store and retrieved by the SLAM module 202 when the bounding box is generated for the games controller 104. The games console 106 can then provide the mapping data which indicates which buttons correspond to which commands to the augmented reality headset 102.

In step S402, the visual element generation module 206 receives mapping data from the games console 106 which indicates which buttons on the games controller 104 correspond to specific in-game commands. That is to say, the games console 106 provides data which will say, for example, that the "X" button on the games console corresponds to an accelerator command in a motor vehicle racing game or that the "Y" button corresponds to a brake command in the same motor vehicle racing game if that is the game which is being played at the time.

The visual element generation module 206 then, in a step S404, uses the data store 204 to determine which known games controller 104 is being used and the landmark data for that games controller 104. This will then indicate the approximate positions of the buttons on the known games controller 104. In a step S406, the visual element generation module 206 then generates images which contain indicia corresponding to the in-game commands, e.g. brake, accelerate. Using the received landmark data for the buttons on the games controller 104, the visual element generation module 206 then generates data which indicates the virtual location for the generated indicia in the augmented reality environment so that they are located next to the appropriate button on the known games controller 104 in the physical environment (as the user interacts with the augmented reality environment using the headset 102). That is to say, the landmark data for the buttons is used to identify where control indicia need to be rendered in the augmented reality environment.

Figure 5:
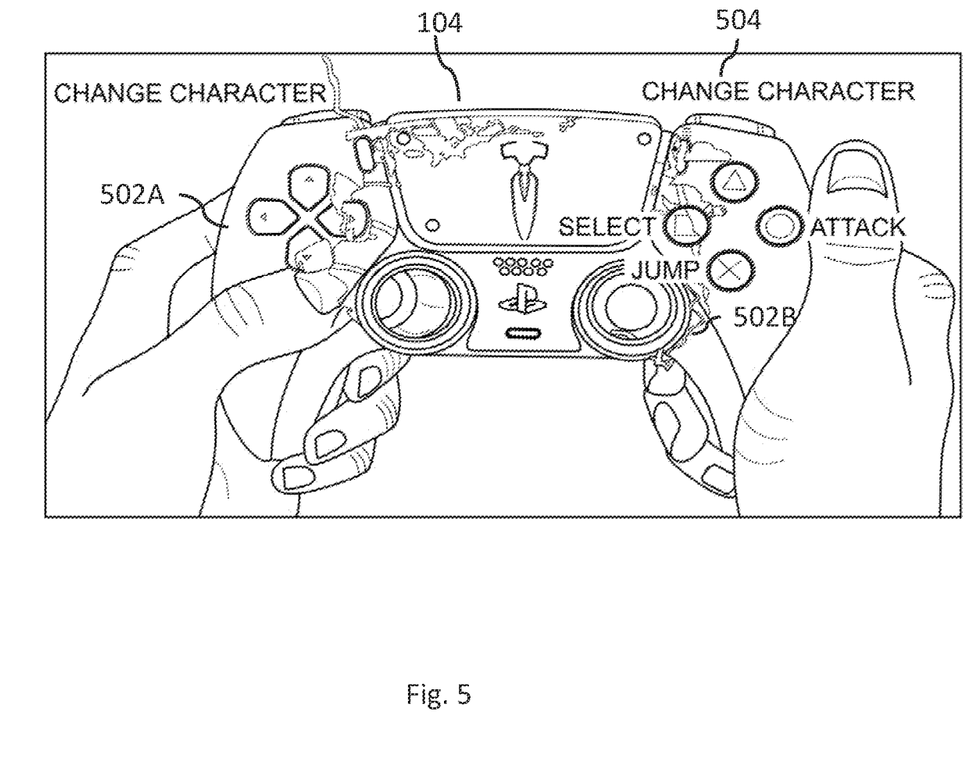
FIG. 5 illustrates a games controller with control indicia and animation overlaid onto the games controller in accordance with the first and/or second embodiments.

In step S408, the visual element rendering module 210 renders the indicia corresponding to the in-game commands in virtual locations next to the corresponding button on the known games controller 104 inside the augmented reality environment provided by the augmented reality headset 102. This is illustrated in another example with commands "change character", "select", "jump" and "attack" being overlaid onto the known games controller 104 in FIG. 5. As is shown in FIG. 5, the control indicia are rendered inside the augmented reality environment so that they are close to the corresponding button which is used to input that command. For example, the change character command is located near to the button at the top of games controller 104 (control indicia 504) as this is the button which needs to be used to provide an input indicative of a desire by the user to change character. As also shown in FIG. 5, the animations generated in steps S300 to S312 may also be rendered with the control indicia. The left and right sections comprise animated portions 502A and 502B rendered by the visual element generation module 206.

User profile data corresponding to the user may be used to determine that the control indicia needs to be in brighter or darker colours, in different languages, larger or smaller fonts or in specific fonts which may, say, be easier to read. The visual element generation module 206 may also receive data from sensor module 200A for the augmented reality headset 102 which says that the control indicia needs to be in brighter colours if a light sensor is indicating the light is low or in darker colours if the light sensor indicates the light is high.

The position of the games controller may of course change as it is being used. Steps S400 to S408 may be repeated whenever the object tracking functionality of the augmented reality headset 102 determines that the position of the games controller has changed. This ensures the control indicia is always visible in the correct virtual location inside the augmented reality environment provided by the headset 102.

That is to say, control indicia for the game can be overlaid into the augmented reality environment so that a user who is wearing the augmented reality headset 102 can see the control indicia next to the button on the games controller which needs to be used to input the respective command. The position of the control indicia can be maintained in the augmented reality environment so that they are retained in a position close to the corresponding button on the games controller even if the user looks away.

Alternatively or additionally, the steps S400 to S408 could be used to overlay controls onto a monitor or a games console, for instance, if they are identified as a known object.

Figure 6:
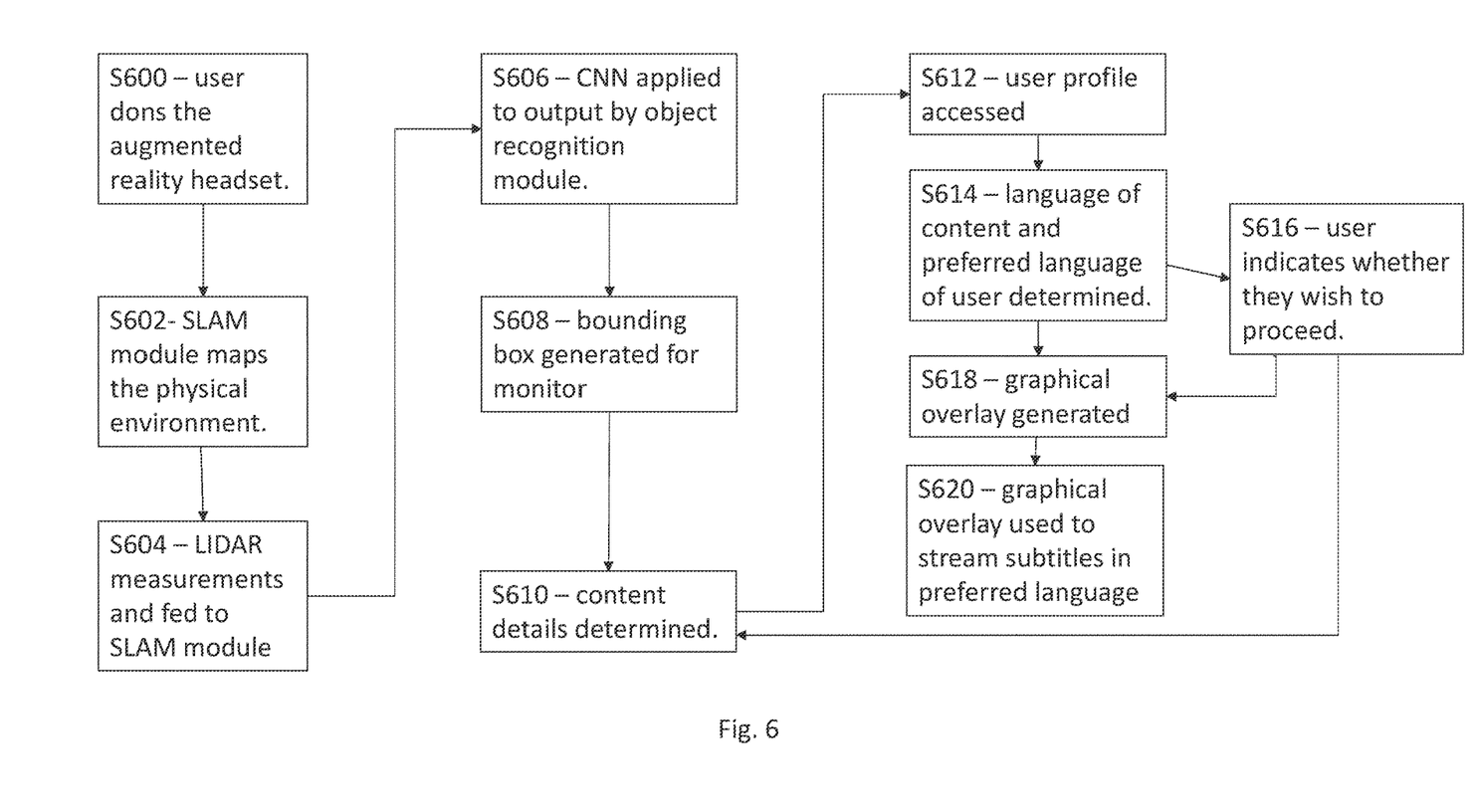
FIG. 6 illustrates a flow diagram for the identification of a monitor and the overlay of subtitles using the augmented reality entertainment environment in accordance with a third embodiment.
Figure 7:
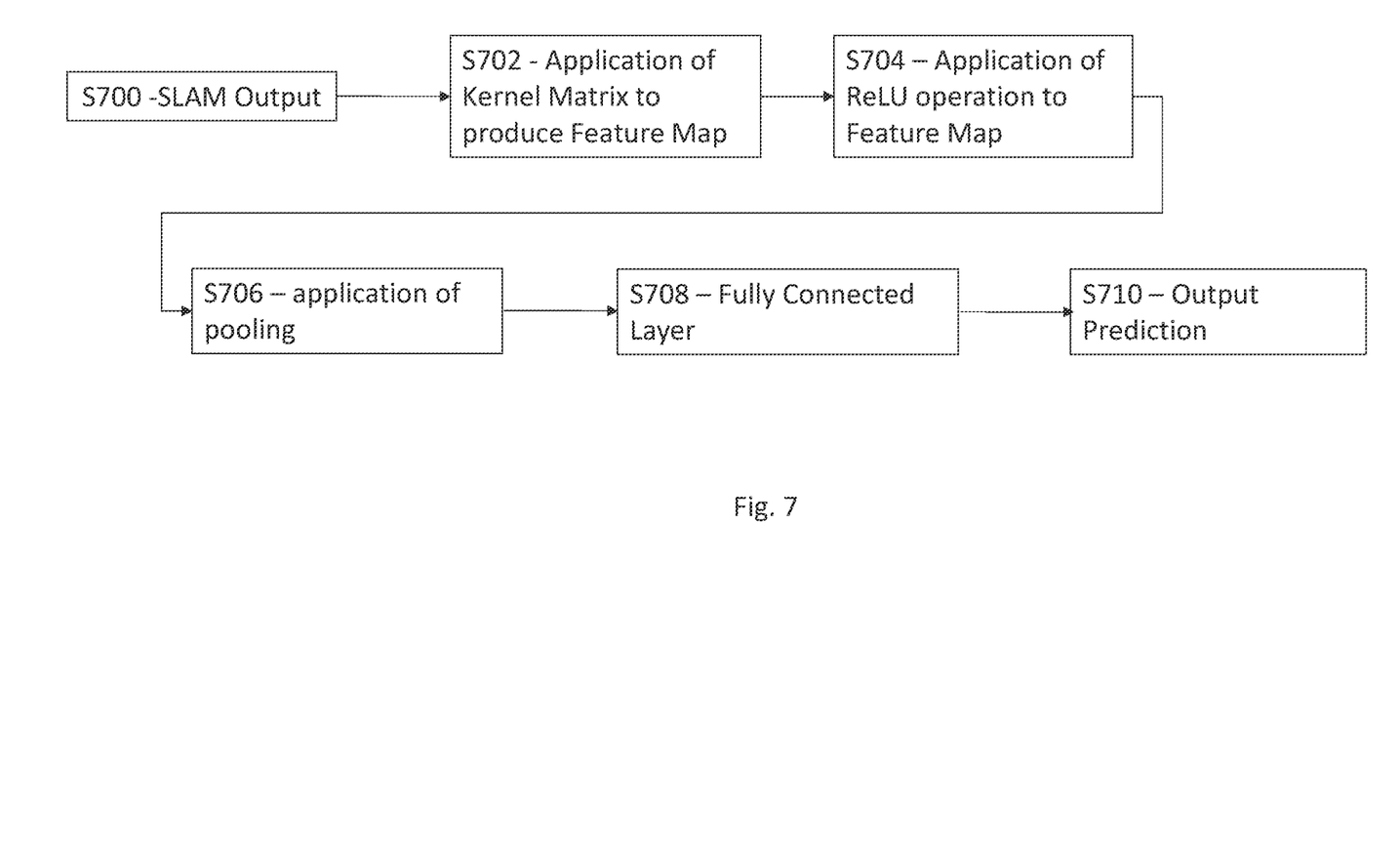
FIG. 7 illustrates the steps of a convolutional neural network which is used to implement the third embodiment.

We will now describe, with reference to FIG. 6 and FIG. 7, a further embodiment which shows how the system 100 can be used to recognise the presence of a monitor as an unknown object in a physical environment where an augmented reality entertainment environment has been initialised.

In a step S600, the user dons the augmented reality headset 102 in a physical environment such as a living room. The living room may contain several objects such as a monitor, a games console and a games controller. The augmented reality headset 102 initialises the augmented reality environment in the living room. The user may provide input to the augmented reality headset 102 to indicate that they wish to view content using the monitor.

The SLAM module 202, in a step S602, is configured to map the physical environment inside the living room and determines the presence of objects, as described with reference to FIG. 3. In the example described with reference to FIG. 1, the games controller 104 was a known object and so the bounding data could be retrieved from storage and used to track the movement and position of the games controller 104, which is then synchronised with a visual element such as an animation. In this example, the monitor is not a known object and, as will be described below, the SLAM module 202, utilises Light Detection And Ranging (LIDAR) measurements received by a LIDAR sub-module 212 to determine the dimensions of an unknown object so that a bounding box can be generated for that object. The LIDAR sub-module 212 may be part of the sensor module 200A and capture data which is then fed into the SLAM module 202 and contribute to the output of the SLAM module 202 in order to enable the presence of objects in the physical environment to be identified.

In a step S604, the LI DAR sub-module 212 receives LIDAR measurements from the surrounding physical environment. This data is fed by the sensor module 200A to the SLAM module 202. The SLAM module 202 applies landmarking techniques to the captured data and this indicates the presence of a rectangular object in the surrounding physical environment. This is because the reflected light from a rectangular object will be detected as a rectangle by the LIDAR sub-module 212 as a a specific reflected light signature. However, the monitor cannot be found in the data store 204 and is therefore treated by the system 100 as an unknown object. The SLAM module 202 then provides the captured data to an object recognition module 214 which is configured to receive the output from the SLAM module 202.

Then, in a step S606, the object recognition module 214 applies a convolutional neural network to the captured image data. The components of the convolutional neural network are illustrated in FIG. 7.

In a step S700, the SLAM module 202 provides captured output data to the object recognition module 214 with a request for the rectangular object to be identified.

The captured output data is provided as a colour image from the SLAM module 202. The object recognition module 214 converts the image to a grayscale image and, in a step S702, a kernel matrix is applied to the grayscale image to produce a feature map as a first convolutional layer of the convolutional neural network. The elements of the kernel matrix are optimised by way of the backpropagation training approach set out below.

In step S704, a rectified linear unit (ReLU) operation is applied to the feature map to remove all negative entries in the feature map. This produces a rectified feature map which can then be used in the pooling step in S706, where maximum pooling is applied to the rectified feature map. This step identifies the contribution of the rectangular object to the captured image data independently of where it is in the image.

The convolutional and pooling layers may be repeated using further feature maps to further refine the data which is then fed into the fully connected layer in S708.

The fully connected layer utilised in step S708 applies a multi-layer perceptron to the output of the pooling layer. The multi-layer perceptron uses the output to classify the input captured image, i.e. the SLAM output provided in step S700, according to the labels which are used in the training dataset.

The multi-layer perceptron which forms the fully connected layer comprises an input layer, where the output of the pooling layer is input, at least one hidden layer which applies several weights to the output of the input layer and an output layer which produces a probability that the input is a monitor. This is step S710.

Figure 8:
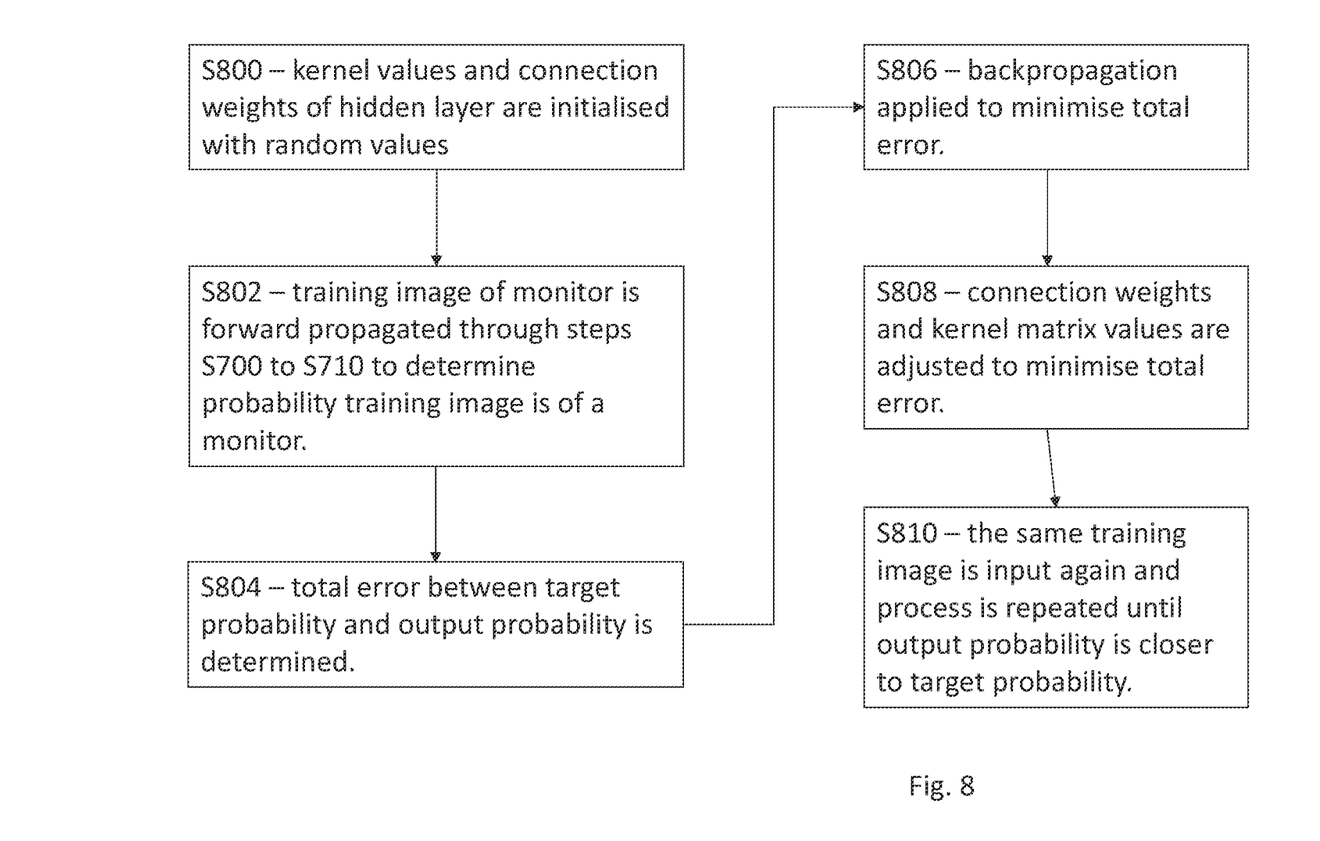
FIG. 8 illustrates the training of the convolutional neural network in accordance with the third embodiment.

The values of the kernel matrix and the connection weights applied by the at least one hidden layer are optimised by way of the training process described in FIG. 8.

In a first step S800, all the values of the kernel matrix and the connection weights of the at least one hidden layer are initialised with random values. In step S802, a training image of a monitor is provided as input and this is passed through the steps as described in S700 to S710 and the output probability that the image corresponds to a monitor is determined. As the values in the kernel matrix and the connection weights are, at this stage, randomly assigned, the output probability may be quite low, even though we know the image is of a monitor. This is because we are only at the first stage of the training process and the relevant values in the CNN are initialised with random values.

In a step S804, the total error is calculated. The total error is the square of the difference between the target probability and the output probability determined in S802. The target probability is initialised prior to step S800 as 1 as we would like images of monitors to be identified as images of monitors.

In step S806, backpropagation is then applied to calculate the gradient of the total error with respect to all connection weights and kernel matrix values. This is with the intention of minimising the total error. This causes the connection weights and the values of the kernel matrix to be adjusted. This is step S808.

In a step S810, the same training image is input again and the steps S800 to S808 are repeated until the output probability is substantially closer to the target probability, i.e. the total error is closer to zero. A threshold output probability for determining the end of the training steps for this image may be approximately 0.9, although in an ideal setting the end of the training steps would arrive when the output probability converges to 1.

The steps S800 to S810 are then repeated for multiple images of monitors in order to further optimise the kernel values and the connection weights.

Referring back to FIG. 6, the application of the convolutional neural network, which is trained in accordance with what is described in FIG. 8, will determine the object is a monitor with high probability. The object recognition module 214 then obtains the coordinates of the monitor from the data output from the SLAM module 202. This can be used to determine the position of the monitor in the physical environment in which the augmented reality environment has been initialised. The object log data cache 208 can then be updated to include the identified monitor. The data for the monitor can also be stored in data store 204 and it can then be treated by the system as a known object.

In a step S608, the SLAM module 202 uses the data stored in data store 204 to generate a bounding box for the monitor so that the position of the monitor can be tracked relative to the augmented reality headset 102.

That is to say, the SLAM module 202 determines the presence of an object in the physical environment in which the augmented reality environment is initialised and uses a convolutional neural network on the captured image data to identify the object as a monitor. The monitor can then be tracked in the augmented reality environment.

Alternatively, the augmented reality headset 102 may also be configured to recognise a gesture from the user wherein the user points to the monitor to identify it as a monitor.

The user inserts a DVD into the games console with the intention of viewing the DVD using the games console. In a step S610, the visual element generation module 206 then accesses a content management module 216 to determine details of the content being viewed on the identified monitor. Content data regarding the content may be provided to the content management module 216 through the insertion of the DVD into the games console which is then communicated to the content management module 216 when the DVD is inserted into the games console. The content data may provide the subtitles for the content or an age limit for the content. The subtitles may be in various languages. The content data may also indicate frames in the content which contain images which may be deemed inappropriate for persons of a particular age. The content management module 216 provides the content data to the visual element generation module 206.

The user profile of the user is then accessed in a step S612 to determine user data which corresponds to the user. The user profile data may be stored in data store 204. The user may have identified themselves as the start of the session by simply selecting an avatar on a homepage provided by the games console through the monitor. The user data may comprise the user's age and their preferred language.

In a step S614, the visual element generation module 206 determines, from the content data, that the language of the content is English but also determines from the user profile of the user that the preferred language of the user is Mandarin Chinese. The visual element generation module 206, on determining the difference between the language of the content and the preferred language of the user, accesses the content data to determine the availability of subtitles in Mandarin Chinese.

If subtitles in Mandarin Chinese are not available, the user is provided with an alert by the visual element generation module 206 which is positioned inside the augmented reality environment provided by the augmented reality headset 102. The alert asks the user if they wish to continue and offers them options "YES" or "NO". The augmented reality headset 102 is configured to recognise a gesture which selects YES or NO and then feeds that to the visual element generation module in a step S616. If the user selects NO then a further alert is provided to advise that the content is changed and the process goes back to Step S610. If the user selects YES the visual element generation module 206 will continue to step S618 described below.

If subtitles in Mandarin Chinese are available, then the visual element generation module 206 will generate a graphical overlay in a step S618 which is used to feed the Mandarin Chinese subtitles into the augmented reality environment provided by the augmented reality headset 102.

The coordinates of the monitor are then retrieved from the SLAM module 202 and used to identify the location of the monitor in physical space. The graphical overlay is then rendered by the visual element rendering module 210 in the augmented reality environment in a location (i.e. a virtual location) adjacent to the monitor. This is step S620. A position adjacent to the monitor means that the graphical overlay is rendered in the augmented reality environment in a position in which it can be seen on the periphery of the monitor by the user who dons the headset 102. This position is maintained so that the graphical overlay can only be seen if the user wearing the headset 102 is looking at the monitor. That is to say, the position of the monitor is tracked relative to the headset 102 in order to provide the graphical overlay but if the user turns and looks away, the position of the graphical overlay will be maintained.

The graphical overlay is then used to display the Mandarin Chinese subtitles in the augmented reality environment in a position adjacent to the monitor so that they can be viewed by the wearer of the augmented reality headset 102 as they are watching the content on the monitor. The feed of the Mandarin Chinese subtitles is synchronised with the content so the displayed subtitles (i.e. those provided in the graphical overlay) are the correct subtitles for the frame or the collection of frames being viewed.

That is to say, the augmented reality headset 102 enables the Mandarin Chinese subtitles to be viewed as the user is looking at the screen. In a multi-user environment, if multiple users each have their own profile, then each user may be provided with different subtitles in preferred languages when they don the augmented reality headset 102. Each user may also be provided with a menu by the respective augmented reality headset 102 which can be used to configure the subtitles, i.e. change the colour, make them larger or smaller etc etc.

Alternatively or additionally, the graphical overlay may be used to stream information from other sources into the augmented reality environment provided by the augmented reality headset 102. The user may be provided with a menu to enable them to select other sources of data to stream into the augmented reality environment. These sources may be external sources of data. The visual element generation module 206 may be configured to access a plurality of APIs (inside an API store 220) which enable the other sources to be accessed and for content to be retrieved from a source and fed into the augmented reality environment through the graphical overlay generated by the visual element generation module. For example, one of the APIs may enable the visual element generation module 206 to access one of the user's social media channels and messages for the user may be fed into the augmented reality environment alongside the subtitles by rendering the graphical overlay so that it includes the message. In another example, one of the APIs may enable the visual element generation module 206 to access a sports news website so that results from a sports event may be fed into the augmented reality environment using the generated graphical overlay.

The steps S600 to S620 could also be used to identify an unknown games controller, for example, in that the object recognition module 214 could utilise a convolutional neural network to identify a games controller which has not been previously identified to the system 100 and saved in the data store 204. This would require the convolutional neural network to be trained (as set out in steps S800 to S810) on images of games controllers so that the connection weights and kernel matrix entries can be optimised to identify games controllers rather than monitors. Alternatively or additionally, at the start of the session, the user could be provided with a user interface to enable them to identify an object which they would like to be identified and/or tracked in accordance with what is described in the above-mentioned examples. The user interface could offer a plurality of options including monitor and/or games controller and/or games console. Alternatively or additionally, the steps S400 to S408 could be utilised in combination with steps S600 to S620 to identify an unknown games controller and then landmarking techniques could be applied to determine the locations of landmarks on the games controller where control indicia can be located. Alternatively or additionally, the steps S304 to S312 may be utilised in combination with steps S600 to S620 to identify an unknown games controller and then render an animation over the games controller after it has been identified.

Any of the above described examples may be combined, either partially or in full, without departing from the disclosure. Any of the above described examples may be applied where there are multiple users, each wearing an augmented reality headset 102.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for providing an augmented reality entertainment environment, the method implemented by a processing resource, the method comprising the steps of:
 initialising the augmented reality entertainment environment at a location;

determining the presence of a physical object;

determining whether the physical object is a known or unknown physical object and, if the physical object is determined to be known, retrieving position tracking data for the object; generating at least one visual element for rendering in the augmented reality entertainment environment; rendering the visual element in the augmented reality environment relative to the location of the physical object; and, if the physical object is determined to be unknown, identifying the object, generating position tracking data for the object to track the position of the object; generating at least one visual element for rendering in the augmented reality entertainment environment; and rendering the visual element in the augmented reality environment relative to the location of the physical object.

2. The method of claim 1, wherein the generation of the visual element for rendering in the augmented reality entertainment environment comprises generation of a graphical overlay.

3. The method of claim 2, wherein the graphical overlay is dimensioned to at least partially cover the physical object.

4. The method of claim 2, wherein the graphical overlay is at least partially animated.

5. The method of claim 2, wherein the generation of the graphical overlay is based on content being displayed in the augmented reality entertainment environment.

6. The method of claim 2, wherein the generation of the graphical overlay is based on content being displayed on the physical object.

7. The method of claim 2, wherein the generation of the graphical overlay is based on an in-game element for a game being played by at least one user of the augmented reality entertainment environment.

8. The method of claim 7, wherein the at least one visual element comprises a stream of information.

9. The method of claim 8, wherein the stream of information is based on content being displayed in the augmented reality entertainment environment.

10. The method of claim 9, wherein the stream of information comprises subtitles related to the content being displayed in the augmented reality entertainment environment.

11. The method of claim 10, wherein the subtitles are provided in a language determined by a user profile.

12. The method of claim 8, wherein the at least one visual element comprises content from a source external to the augmented reality entertainment environment.

13. The method of claim 12 wherein the content from the external source comprises a social media feed.

14. The method of claim 1, wherein the physical object is identified based on a trained model.

15. The method of claim 1, wherein rendering the visual element in the augmented reality entertainment environment comprises synchronising the position of the visual element with the identified position of the physical object.

16. The method of claim 1, wherein rendering the visual element in the augmented reality entertainment environment comprises locating the visual element adjacent to the physical object.

17. The method of claim 1, wherein the visual element comprises control indicia for content being displayed in the augmented reality entertainment environment.

18. The method of claim 17, wherein the control indicia is located adjacent to the physical object.

19. A system configured to implement the method of claim 1.

* * * * *